United States Patent Office 3,045,051
Patented July 17, 1962

3,045,051
PRODUCTION OF DIALKYL SULFOXIDES
James G. Coma and Virgil G. Gerttula, Vancouver, Wash., assignors to Crown Zellerbach Corporation, San Francisco, Calif., a corporation of Nevada
No Drawing. Filed Dec. 21, 1959, Ser. No. 860,741
13 Claims. (Cl. 260—607)

This invention relates to a process for the production of dialkyl sulfoxides. More particularly, the present invention relates to a process for the preparation of dialkyl sulfoxides from corresponding sulfides by oxidation thereof in liquid phase in the presence of a catalytic amount of a nitrogen oxide or concentrated nitric acid.

Several methods for the oxidation of organic sulfides to the corresponding sulfoxides have been described. Oxidations of dialkyl sulfides in the vapor phase with an oxygen-containing gas in the presence of a catalytic amount of a nitrogen gas have been disclosed by Smedslund in U.S. Patent Nos. 2,581,050 and 2,825,744. In these processes the sulfide is converted into the gaseous form prior to its conversion into the sulfoxide, which process requires a relatively high temperature of the reaction and is difficult to carry out commercially due to large volumes of reactants which have to be handled. Furthermore, relatively large losses of nitric oxide employed as a catalyst occur during condensation of the reaction products due to the solubility of nitric oxide in the condensation product containing a mixture of a dialkyl sulfide and sulfoxide. U.S. Patent No. 2,825,745 (Smedslund) relates to a method for the manufacture of sulfoxides from the corresponding sulfides in either the liquid or the vapor phase. The latter method includes removal of moisture from the reactants, and particularly from atmospheric air which is used as the oxidizing medium in order to improve the yields of the resulting sulfoxides. In U.S. Patent No. 2,702,824 (Wetterholm et al.), liquid phase oxidation of dialkyl sulfides to the corresponding dialkyl sulfoxides with an oxygen-containing gas in the presence of a catalytic amount of a nitrogen oxide is described.

Although the liquid phase prior art processes described hereinabove are generally satisfactory, they require a very careful control of the reaction conditions due to highly exothermic oxidation reaction. Moreover, the reaction rate per unit volume of the reactor is relatively low and the consumption of the nitric oxide catalyst is relatively high. All of the foregoing processes are characterized by the fact that the entire volume of oxygen or oxygen-containing gas required for the conversion of the sulfide to the corresponding sulfoxide is introduced at the initial stage of the reaction. As mentioned hereinabove, due to a highly exothermic character of the reaction at the point of oxygen feed into the dialkyl sulfide, serious difficulties have been encountered in removing the heat of the reaction and maintaining the reaction temperature within the desirable limits. Furthermore, the rate of incorporation of the reactants must be limited by the heat transfer capacity of the reactor adjacent to the point of addition of oxygen.

We have now discovered that the above mentioned disadvantages of the liquid phase oxidation methods of the prior art can be overcome by introducing only a portion of the amount of oxygen necessary for conversion of the dialkyl sulfides to the corresponding sulfoxides at the initial point of the reaction zone, and introducing the remaining portion of oxygen into at least one other point of the reaction zone during the passage of the reaction mixture through said zone.

It is, therefore, the general object of the present invention to provide an economical and commercially attractive process for the production of dialkyl sulfoxides from the corresponding sulfides in the liquid phase using oxygen or air as the oxidizing agent in the presence of a small catalytic amount of an oxygen-transmitting nitrogen oxide or concentrated nitric acid by incorporating the oxygen gas at multiple points in the reaction zone.

A further object of the present invention is to provide an improved process for the production of dialkyl sulfoxides in the liquid phase, which process is safe and convenient to operate and in which the reaction rate per unit volume of the reactor is significantly increased while the amount of the nitrogen oxide catalyst employed is markedly reduced.

Other objects of this invention will be apparent to those skilled in the art from the following disclosure.

The essential characteristic of this invention lies in the provision of an improved step in the course of the oxidation of a dialkyl sulfide to the corresponding sulfoxide in the liquid phase, namely the introduction of oxygen or air at multiple points of the reaction zone, as compared to the prior art procedures wherein the entire amount of oxygen necessary for conversion of the sulfide to the sulfoxide is added at the initial point of the reaction zone.

Generally stated, the herein described process of producing a dialkyl sulfoxide comprises introducing at the initial point of the reaction zone a liquid dialkyl sulfide, a catalyst selected from the group consisting of nitrogen oxides and concentrated nitric acid and a portion of the stoichiometric amount of oxygen necessary for conversion of the sulfide to the sulfoxide. Thereafter the remaining portion of the stoichiometric amount of oxygen is introduced into at least one other point of the reaction zone, the latter point being longitudinally spaced from the initial point of the introduction of oxygen. After the entire amount of oxygen which is required for complete conversion of the sulfide to the sulfoxide has been introduced, the resulting dialkyl sulfoxide is withdrawn at the opposite end of the reaction zone. The vent gases containing primarily a reduced nitrogen oxide flow out at the same end of the reaction zone and may be recovered and recycled or otherwise disposed. The liquid dimethyl sulfoxide may be purified in order to remove a small amount of impurities, such as methane sulfonic acid and unreacted dialkyl sulfide. If desired, a portion of the purified dialkyl sulfoxide may be recycled and reintroduced into the initial point of the reaction zone together with the catalyst.

It should therefore be emphasized that, whereas the prior art processes are based on the incorporation of the entire amount of oxygen in the beginning of the oxidation reaction, the process of this invention is based on a gradual oxidation reaction by incorporating oxygen in multiple points throughout the reaction zone. In this manner, the desired reaction conditions are considerably easier to control and the conversion of the sulfide to the corresponding sulfoxide is substantially complete while the amount of the catalyst required for the reaction is substantially reduced.

The process of this invention is applicable to the oxidation of dialkyl sulfides having the formula R—S—$R_1$ wherein R is an alkyl group containing up to 4 carbon atoms and $R_1$ is the same or a different alkyl group containing up to 18 carbon atoms. Such dialkyl sulfides include lower dialkyl sulfides, for example dimethyl sulfide, diethyl sulfide, dipropyl sulfide, dibutyl sulfide, methyl ethyl sulfide, methyl butyl sulfide, methyl isopropyl sulfide; methyl-higher alkyl sulfides, for example methyl octyl sulfide, methyl octadecyl sulfide; as well as ethyl-butyl sulfide, butyl octyl sulfide, etc.

The preferred oxidizing gas in accordance with the invention is pure oxygen. However, air or a mixture of oxygen and air are satisfactory. The total amount of oxygen introduced into the reaction zone should be sufficient to effectuate a substantially complete conversion of the dialkyl sulfide to the corresponding sulfoxide in accordance with the stoichiometry of the reaction.

The catalysts which may be used in the oxidation reaction of this invention include nitrogen oxides such as NO, $NO_2$, $N_2O_3$, and $N_2O_4$, as well as concentrated nitric acid preferably of at least 99% concentration. Due to the uniform nature of the reaction and the gradual conversion of the organic sulfide to the corresponding sulfoxide, the amount of the catalyst employed is substantially lower than that employed in the prior art processes including a single introduction of oxygen into the reaction zone.

For example, using the stepwise procedure of adding oxygen into four points of the reaction zone and introducing nitrogen dioxide in the amount of 1 mole of $NO_2$ per 20 moles of dimethyl sulfide, we have obtained a final reaction product containing 96% dimethyl sulfoxide. On the other hand, with an addition of oxygen at one point only at the bottom of the same reactor, a greater amount of $NO_2$ catalyst, namely 1 mole of $NO_2$ per 15 moles of dimethyl sulfide, was required and the final reaction product contained no more than 92% of dimethyl sulfoxide.

The process of this invention may be carried out over a wide range of temperatures, e.g. from as low as above the freezing point of the liquid mixture up to about 60° C., preferably between 15° C. and 50° C. The conversion of the sulfide to the corresponding sulfoxide occurs in a very short period of time and is substantially complete. The yields are very good, usually in excess of 95% of the theoretical value.

The following example is presented in order to illustrate but not to limit the scope of the present invention.

Dimethyl sulfide, a solution of nitrogen dioxide ($NO_2$) in recycled dimethyl sulfoxide and approximately one-quarter of the stoichiometric amount of oxygen required for the conversion of the sulfide to the sulfoxide are fed continuously at the bottom of a vertical reactor provided with pipes conveying a cooling liquid, such as water, and having about 22 square feet of heat transfer surface per cubic foot of reactor volume, which is adequate for removal of the heat of reaction. While the resulting liquid mixture is passed upwardly through the reaction zone, the remaining three-quarters of said stoichiometric amount of oxygen are introduced successively in substantially equal proportions into three other longitudinally and equally spaced points above the point of initial introduction of oxygen into the reaction zone. The vent gases containing primarily reduced nitrogen oxide (NO) flow out at the top of the reactor, while the resulting liquid dimethyl sulfoxide is withdrawn from the reaction zone at a point adjacent the top of the reactor. The dimethyl sulfoxide may be purified, if desired, and a portion thereof may be recycled for the preparation of fresh nitrogen dioxide catalyst solution to be introduced at the bottom of the reactor. Similar procedure may be applied to the conversion of other dialkyl sulfides in conjunction with other catalysts, as set forth hereinabove.

The typical process conditions employed in conjunction with the present example are given in Table 1 hereinbelow together with the conditions applied to a prior art process wherein the entire stoichiometric amount of oxygen is incorporated at the initial point of the reaction zone.

*Table 1*

| | Present Process | Prior Art Process |
|---|---|---|
| Dimethyl Sulfide Reaction Rate, grams/hour | 6,950 | 1,720 |
| $NO_2$ Addition Rate, grams/hour | 258 | 87 |
| Amount of $NO_2$ Added Based On Dimethyl Sulfide, Percent | 3.72 | 5.06 |
| Volume of Reactor, cu. ft | 0.673 | 0.334 |
| Reaction Temperature, ° C | 35–50 | 35–50 |
| Reaction Rate, Lbs. Dimethyl Sulfide/hr./cu. ft. of Reactor | 22.70 | 11.35 |
| Dimethyl Sulfoxide Yield, Percent | 96 | 92 |

It will be apparent from the tabulated data that the process of the present invention offers several commercially significant advantages, as compared to that of the prior art, namely a double reaction rate per unit reaction volume, a decrease of about 27% in the amount of nitrogen dioxide catalyst consumed, a higher yield of dimethyl sulfoxide produced with the attendant substantially complete conversion of the dimethyl sulfide to the dimethyl sulfoxide.

The above-mentioned and other advantages of the present process greatly enhance the economic aspects of producing dimethyl sulfoxide and other dialkyl sulfoxides on a commercial scale. Dimethyl sulfoxide is potentially useful as a versatile solvent for various types of polymers and for certain gases, such as acetylene, as a softener and humectant for cellulosic materials, and as a freezing point depressant for water. Higher dialkyl sulfoxides prepared according to this invention may be used as surface-active agents, detergents and plasticizers.

It is to be understood that changes and modifications may be made in regard to specific details of the invention herein described which are intended to be included within the scope of the appended claims.

We claim:

1. In a process of producing a dialkyl sulfoxide from a corresponding sulfide by oxidation thereof in liquid phase which comprises reacting in a reaction zone a dialkyl sulfide with oxygen in the presence of a catalyst selected from the group consisting of nitrogen oxides and concentrated nitric acid and then withdrawing the resulting sulfoxide from the reaction zone, the improvement which comprises introducing at the initial point of said reaction zone a portion of the stoichiometric amount of oxygen necessary for conversion of the sulfide to the sulfoxide and introducing the remaining portion of the stoichiometric amount of oxygen into at least one other point of said reaction zone to effect a substantially complete conversion of the sulfide to the sulfoxide.

2. The process of claim 1 wherein the dialkyl sulfide comprises a lower dialkyl sulfide.

3. The process of claim 1 wherein the dialkyl sulfide comprises a methyl-alkyl sulfide.

4. The process of claim 1 wherein the dialkyl sulfide comprises dimethyl sulfide.

5. The process of claim 1 wherein the catalyst comprises nitrogen dioxide.

6. The process of claim 1 wherein the oxidation is carried out at a temperature in excess of the freezing point of the reaction mixture but not exceeding about 60° C.

7. The process of claim 1 wherein the oxidation reaction is carried out between about 15° C. and 50° C.

8. The process of claim 1 wherein substantially equal portions of the stoichiometric amount of oxygen are introduced at four longitudinally and approximately equally spaced points of the reaction zone.

9. The process of claim 1 wherein the dialkyl sulfide, the catalyst and a pffiortion of said stoichiometric amount of oxygen are introduced at a point near the bottom of a vertical reaction column, the reaction mixture is passed upwardly, the remaining portion of said stoichiometric amount of oxygen is introduced into at least one other point in the column above the point of the initial introduction of oxygen, and the resulting sulfoxide is withdrawn near the top of the reaction column.

10. In a process of producing dimethyl sulfoxide by oxidation of dimethyl sulfide in liquid phase in the presence of nitric dioxide catalyst, the improvement which comprises introducing the stoichiometric amount of oxygen necessary for conversion of the sulfide to the sulfoxide into at least two longitudinally spaced points of the reaction zone.

11. The process of claim 10 wherein substantially equal portions of the stoichiometric amount of oxygen are introduced at four longitudinally and approximately equally spaced points of the reaction zone.

12. The process of claim 10 wherein the oxidation of dimethyl sulfide is carried out at a temperature in excess of the freezing point of the reaction mixture but not exceeding about 60° C.

13. The process of claim 10 wherein the oxidation of dimethyl sulfide is carried out between about 15° C. and 50° C.

References Cited in the file of this patent

UNITED STATES PATENTS

| | | |
|---|---|---|
| 2,654,658 | Marshall | Oct. 6, 1953 |
| 2,702,741 | Robertson | Feb. 22, 1955 |
| 2,702,824 | Wetterholm et al. | Feb. 22, 1955 |
| 2,797,151 | Schnur et al. | June 25, 1957 |